United States Patent [19]

Netzsch

[11] 4,297,560
[45] Oct. 27, 1981

[54] PROCESS AND APPARATUS FOR TESTING ARC STUD WELDING GUNS

[75] Inventor: Hermann Netzsch, Grueningen, Fed. Rep. of Germany

[73] Assignee: USM Corporation, Farmington, Conn.

[21] Appl. No.: 14,802

[22] Filed: Feb. 26, 1979

[51] Int. Cl.³ .............................................. B23K 9/20
[52] U.S. Cl. ................................. 219/130.01; 219/98; 219/99
[58] Field of Search ..................... 219/98, 99, 130.01

[56] References Cited

U.S. PATENT DOCUMENTS 4,042,800  8/1977  Glorioso ........................... 219/98
4,132,879  1/1979  Glorioso ..................... 219/130.01

*Primary Examiner*—C. C. Shaw
*Attorney, Agent, or Firm*—William F. White; Aubrey C. Brine

[57] ABSTRACT

Both process and apparatus are disclosed for testing arc stud welding guns. The process and apparatus are premised on generating two electric signals, the first of which occurs as a result of a switching action at the beginning of a welding operation. The second occurs when the welding stud impacts it's counter-electrode. The elapsed time between these signals is measured and used as a basis to determine the effectiveness of the arc stud welding gun. Process and apparatus are both disclosed for testing during actual and simulated arc welding.

7 Claims, 3 Drawing Figures

PROCESS AND APPARATUS FOR TESTING ARC STUD WELDING GUNS

BACKGROUND OF THE INVENTION

The invention concerns a test process for drawn arc working stud welding guns and also a circuit arrangement for carrying it out.

In drawn arc stud welding, the stud welding gun, with the welding stud held by it, is placed on the workpiece. A switch is thereafter operated so as to produce a small current over the welding stud to the workpiece. Because of the operation of the switch, the welding stud is raised by means of a lifting solenoid contained in the stud welding gun, whereby a relatively weak arc is produced between the welding stud and the workpiece. In this operating condition a welding current supplied from a condensor battery is added which causes the welding stud and the opposing surface of the workpiece to melt. Finally, with the welding current still flowing, the welding stud is brought up to the workpiece again and dips into the melted part of the workpiece and this completes the welding operation.

The use of a rectifier for supplying the welding current is in principle also possible for the process described above. In practice however the condensor battery is generally used as a source of energy for the welding current for specific applications. The current impulse supplied by the condensor battery is very short and lasts about 6-10 milliseconds. The feed movement of the welding stud must be matched to this short period of time, that is the movement of the welding stud and thus the mechanical design of the stud welding gun are of decisive importance for the quality of the weld. In order to create conditions as clearly defined as possible for the feed movement a definite value has been placed up to now on the mechanical design of the stud welding gun and particularly on the progress of its movements, whereby correspondingly high requirements are placed on the components of the stud welding guns concerned with the progress of the movements.

It has however been shown that nevertheless the movements in stud welding guns of all types, and particularly the feed movement, are subject to considerable fluctuations. The welding results were better or worse because of these fluctuations. This problem has been attacked up to now by first carrying out test welds of which the welding results are then examined in order thus to determine whether a stud welding gun gives optimum results. When it was found that the welds were unsatisfactory, the cut-out of the lifting solenoid of the stud welding gun produced by the starting signal was shifted with regard to the time it occurred. To do this several cut-out moments had to be tried out and without, except in rough cases, it being ascertainable in advance whether the times (moments) had to be advanced or retarded. In this way an optimum setting was finally found after a few try-outs. In subsequent operation of this optimum setting however, there were variations caused by the changing of the mechanical working time of the gun so that afterwards the optimum value had to be checked time and again by means of tests. This resulted not only in loss of time and materials before the stud welding gun could be used, but in interruptions in production which were untenable, particularly in the case of conveyor belt production where stud welding guns are frequently used.

SUMMARY OF THE INVENTION

The object of this invention is to eliminate the aforementioned disadvantages by means of an objective test for stud welding guns which determines their optimum setting without material wear. This is achieved according to the present invention, by first producing an electric starting signal with a switching operation occurring at the beginning of the welding operation. An electric cut-out signal is also produced by means of a short-circuiting caused by the impact of the welding stud on its counter-electrode. Both the starting and the cut-out signals are fed to a time meter which measures and indicates the time between both signals.

By means of this test process, a specific period of time is therefore obtained out of all the actions in the stud welding gun. These actions are started off by the initial operation of the switch, from which a criterion for the correct setting of the stud welding gun can be derived. This period of time does not begin until the lifting solenoid is energized, namely at the beginning of the welding operation, and ends on completion of the welding operation. This completion is defined by the impact of the welding stud with its counter-electrode. It has, in fact, been found that the moment when the welding stud dips into the melted part of the workpiece is of decisive importance. This moment must be shortly before the end of the welding impulse for a good weld. This means that the lifting solenoid must be switched off at a time so, that the correct point for stud dipping to the melted ground is obtained. In the case therefore where the mechanical actions in the stud welding gun are slow, the lifting solenoid must be switched off relatively early. In any case this switching off point is before the occurrence of the condensor discharge for the welding current, and the slower the stud welding gun works the earlier it must be.

According to the present inventive test process, a test of stud welding guns can also be carried out without actually performing a welding operation. The test can be carried out before the guns are put into use or repaired in the workshop, or even while actually in operation, whereby the welding work can be continued without interruption. In this case the optimum value can always be set immediately since because of the measurement of the time it can be ascertained whether the switching off of the lifting solenoid must be earlier or later.

For testing stud welding guns without a welding operation the switching off of their lifting solenoids is used as a starting signal and the short-circuiting of an auxiliary voltage between a clamped-in welding stud and a plate simulating a workpiece is used as the switching off signal.

For testing stud welding guns when in operation, the welding current going beyond a threshold value is used as a starting signal and short-circuiting the arc voltage when dipping the welding stud in the melted part of the workpiece is used as the switching off signal.

In both cases the time meter indicates a specific period of time. If it is a question of a test without a welding operation, the time for the lifting solenoid to be switched off must then be set accordingly. The switching off of the lifting solenoid and the switching on of the welding current is carried out in a known control circuit, working in conjunction with this stud welding gun, which comes into operation by the actuation of the above-mentioned switch at the beginning of the actual welding operation and then causes the lifting solenoid to be switched off and the welding current to be switched on at the end of specific periods of time. The time from the actuation of the switch to the lifting solenoid being switched off is able to be set on these known control units. The setting for switching off the lifting solenoid is then chosen, taking into account the time measured, so that the time maintained from the actuation of the switch until the welding current is switched on, plus the duration of the welding current impulse, is equal to the time set between the actuation of the switch and the switching off of the lifting solenoid plus the time interval measured.

When testing in operation a time interval is also read off direct from the time meter. The time interval in this case corresponds essentially to the duration of the welding current impulse, from which an optimum duration according to the material and the welding job is known. As a rule the duration of this impulse, as already mentioned, is about 6 milliseconds. If on the contrary a shorter time is indicated, the time when the lifting solenoid is switched off must be delayed accordingly and, in fact, by the amount of time which the time indicated exceeds the 6 milliseconds mentioned.

If an interval of time of more than 6 milliseconds is indicated the time the lifting solenoid is switched off must be advanced accordingly.

BRIEF DESCRIPTION OF THE DRAWINGS

The invention is further explained below on the basis of the figures wherein.

DESCRIPTION OF THE PREFERRED EMBODIMENT

Figures 1, 4:
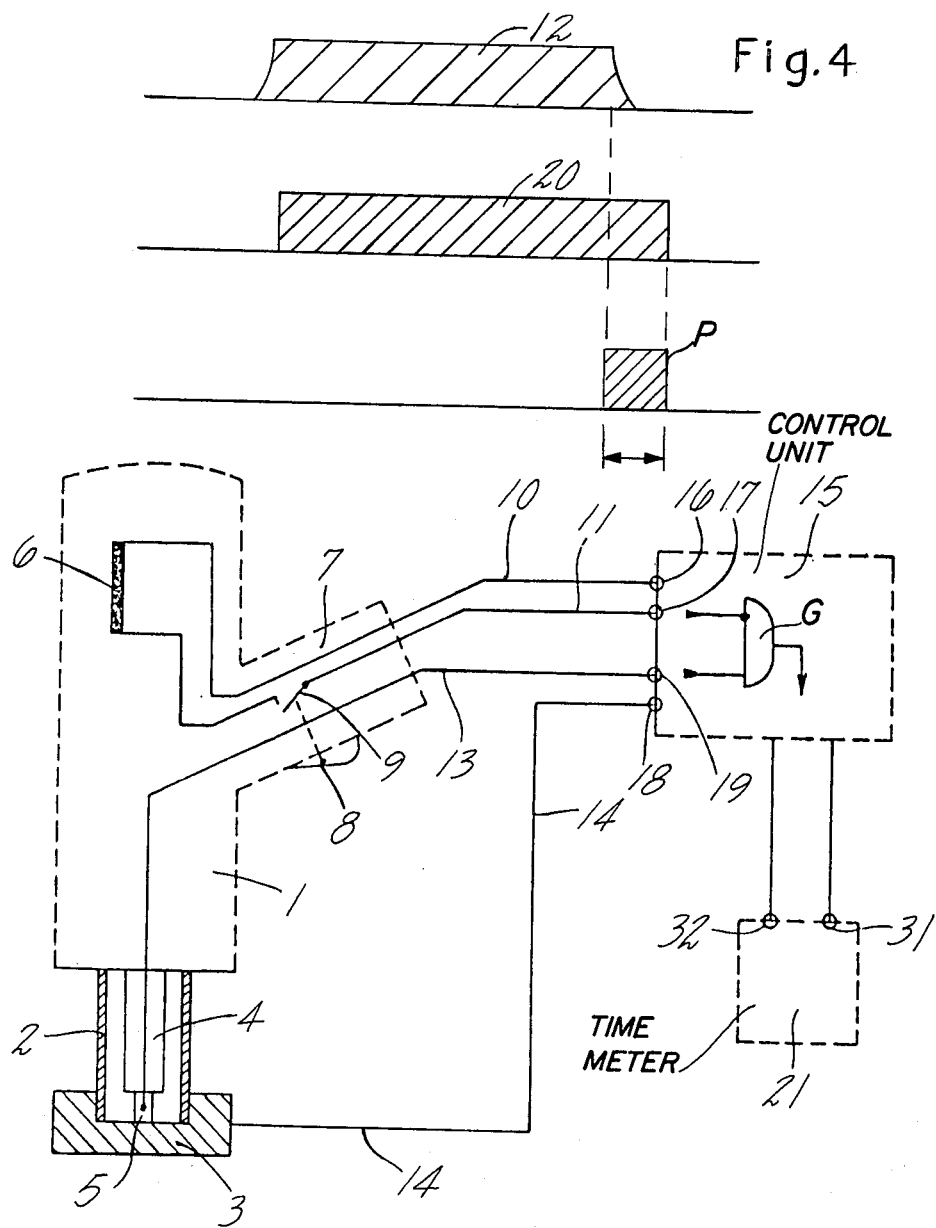
FIG. 1 illustrates the principle of a circuit for testing stud welding guns without a welding operation.

FIG. 1 shows a welding gun in diagrammatic form. The support tube 2 on which the plate simulating a workpiece 3 is placed projects from the front end of the welding gun 1. The plate 3 is removably fixed to the tube 2. The stud holder 4, which carries a welding stud 5 at its front end, runs inside the support tube 2. The stud holder 4 can be pulled into the stud welding gun 1, against the tension of a spring not shown, in a known manner by the solenoid 6. When the solenoid is switched on, the stud holder 4 together with the welding stud 5, is pulled into the stud welding gun 1 about 1.5 mm, and when the solenoid 6 is switched off the stud holder 4, together with the welding stud 5 is pushed forward again by the action of the spring. These operations and the components required for them are already known.

A number of leads, (which are required for the normal operation of the stud welding gun 1) run into the handle 7 of the gun. An operating button 8, mounted on the handle 7, closes the switch 9 when pressed inwardly. When the switch 9 is closed, an energizing current for the solenoid 6 flows through the leads 10 and 11. Lead 11 contains the switch 9 which, when closed, supplies the energizing current to the solenoid 6. All this is a simplified indication of the known principle of a known stud welding gun.

Normally, when the button 8 is pressed, it closes an auxiliary switch which in turn switches on the energizing current for the solenoid 6 through an electronic relay. It then remains switched on for a specific period represented by a first impulse 12. It is therefore a prerequisite for the following representation that the switch 9 can always only be operated for this specific period of time.

The lead 13, which carries the welding current and which is electrically connected to the stud holder 4, runs out of the handle 7. Furthermore, the plate 3 is connected to the lead 14 so that there is a circuit containing the lead 13, the stud holder 4, the stud 5, the plate 3 and the lead 14. The leads 10, 11, 13 and 14 are connected to the control unit 15, which corresponds in principle to the known control unit of a stud welding gun. This control unit 15 provides a voltage on its terminals 16 and 17 for energizing the solenoid 6. There is an auxiliary voltage on its terminals 18 and 19 which is short-circuited when contact is made between the welding stud 5 and the plate 3. This auxiliary voltage corresponds in normal operation to the voltage of the condenser supplying the welding current.

When the switch 9 is now closed by operating the button 8 for the above-mentioned specific period (as governed by an impulse 12), the solenoid pulls the stud holder 4 with the welding stud 5 away from the plate 3, and in this way breaks the contact between the welding stud 5 and the plate 3. Consequently, the short circuit across terminals 18 and 19 is removed so that these terminals carry the auxiliary voltage for a specific time, which is represented by a second impulse. Because of the response time of the solenoid 6, this second impulse does not begin until after the front flank of the first impulse. If then the switch 9 is turned off again (rear flank of first impulse), the stud holder 4 with the welding stud 5 is driven out of the welding gun 1 again by the spring action already mentioned above, so that the welding stud 5 again makes contact with the plate 3. This short circuits the auxiliary voltage on terminals 18 and 19 (rear flank of second impulse 20). Because of the time taken for the stud holder to move from the pulled back position to the position shown, the rear flank of the second impulse must be obviously later than the rear flank of the first impulse.

Now in a signal processing known manner, the control unit 15 generates a separate impulse P in FIG. 4 and feeds it to the time control 21. This is accomplished in the preferred embodiment by a logic gate G resident within the control unit 15 of FIG. 1. The logic gate G receives the first impulse 12 appearing on the terminals 16 and 17 through an inverted input as shown. The logic gate G furthermore receives the second impulse 20 appearing on the terminals 18 and 19. It will be appreciated that the output of the logic gate G will be logically high when the impulse 12 drops off indicating a logical zero while the impulse 20 in the second input remains logically high. The output of the gate G will be the separate impulse P of FIG. 4. The time control thus mixes the intervals between the switching off of the solenoid and the re-occurrence of a short circuit between the terminals 18 and 19, given by the repetition of the contact between the welding stud 5 and the plate 3. A value for this interval must now arise which is such that the repetition of the short circuit between the weld stud 5 and the plate 3 (rear flank of second impulse) occurs at the same time as the weld current flows when the gun is operating. Because of the known effect of the control unit 15 the switching on of the welding current supplied by the condensor begins at a specific moment after the contact 9 closes (front flank of first impulse 12). This time is known and defined for each control unit in conjunction with the welding of specific workpieces. So that this production of the short circuiting between the welding stud 5 and the plate 3 (when operating dipping into the melted part of the workpiece) occurs at the desired moment, the moment when the solenoid is switched off (rear flank of first impulse) must if necessary be advanced or retarded, since the interval measured by the time meter 21 is associated with this rear flank.

If the value, occurring for this interval, allows for a moment of repetition of the short circuiting between the welding stud 5 and the plate 3 (which is after the end of the welding impulse) then, the time during which the solenoid 6 is switched on must be shortened, that is the rear flank of the first impulse is displaced to the left so that the first impulse is shorter. Then the interval measured by the time meter 21 associates itself with this shortened impulse, the end of which (repetition of the short-circuiting between the welding stud 5 and the plate 3) coincides with the end of the welding current impulse occurring during operation if the length of the first impulse is correctly set. This change in the duration of the first impulse can easily be accomplished by means of a calibrated setting member on the control unit. Known control units of such a type are also provided with the corresponding setting members.

The circuit shown in FIG. 1 is suitable for testing one gun after another with the plate 3, whereby the individual interval per gun indicated by the time meter 21 is a direct measurement for setting the duration of the first impulse 12. With this test there is also immediately detected a gun with either a greatly fluctuating interval or with an interval which is a long way from the norm, which can then be eliminated. Thus, it can be avoided that a faulty stud welding gun can be manufactured at all.

For carrying out a test of stud welding guns without a welding operation as shown in FIG. 1, a special time meter can be used in which the control unit 15 is built in, so that the time meter 21 and the control unit 15 form a single unit. In this case the operation of the switch 9 effected through lead 11 in this single unit can be used to switch the time meter on and off, whereby when it is switched off it always returns automatically to zero. With the subsequent switching on of the time meter when switch 9 is closed it is switched over to operation.

Figure 2:
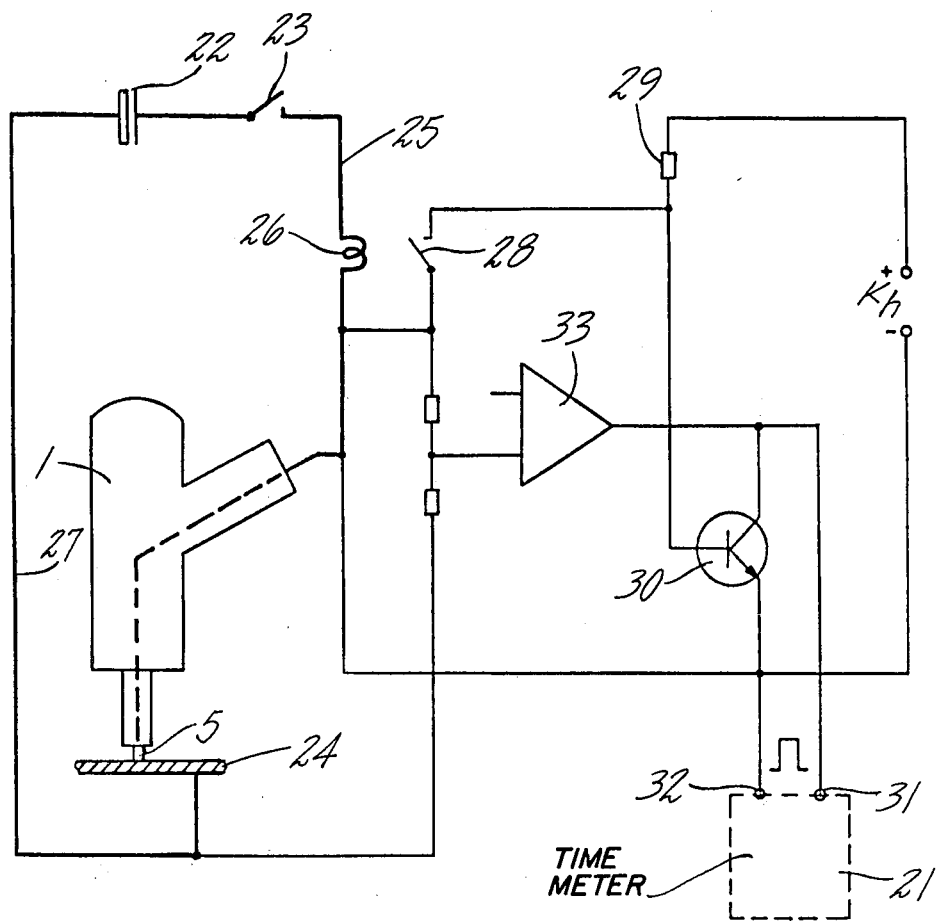
FIG. 2 illustrates the principle of a circuit for testing stud welding guns when in operation.

The circuit shown in FIG. 2 is for testing stud welding guns in operation. The circuit contains the welding current supply condensor 22, which provides its current to the welding gun 1 through contact 23. Contact 23 is generally a thyristor. The welding gun 1 is opposite the workpiece 24. The welding current supplied by the condensor 22 through contact 23 flows through lead 25 to the coil 26, which has about two windings, and thence through the welding gun to the welding stud 5 and on contact with the workpiece 24 to lead 27 back to the condensor 22.

The testing of a welding gun while in operation will now be described. First, the welding operation after placing the welding gun 1 on the workpiece 24 and closing the contact 23 occurs, whereby a current flowing through the coil 26 and the gun 1 to the workpiece 24 is produced. As this welding current increases the Reed contact 28 is finally operated by the field of coil 26. The Reed contact 28 thus becomes a threshold value switch. A positive potential fed through the intermediate resistance 29 is reduced to a zero value through the Reed contact 28. This potential is on the basis of transistor 30, which is penetrable when the positive potential becomes effective and thus short circuits terminal points 31 and 32. When the contact 23 closed, a current was fed to these terminal points 31, which is taken from the voltage of the condensor 22 by the operation amplifier 33. The operation amplifier 33 reduces the voltage of the condensor from about 100 V to 190 V down to about 12 V. If the contact 23 is open the operation amplifier 33 provides no voltage. Due to the effect of the transistor 30 therefore the voltage provided by the operation amplifier 33 after contact 23 closes is short-circuited until the Reed contact 28 closes. At this moment the potential on the base of transistor 23 is reduced to emitter potential so that the transistor 33 cuts out. Now the voltage supplied by the operation amplifier can reach the terminals 31 and 32. According to the foregoing therefore the welding current has just exceeded the threshold value mentioned. When, during the course of the welding operation the welding stud 5 is moved up to the workpiece 24 again there is a short circuit between the leads 25 and 27, so that the operation amplifier 33 has a zero voltage on its output. There is then also a zero voltage again on terminals 31 and 32 determined by the response of the Reed contact 28 on its front side and by the repetition of the touch contact between the welding stud 5 and the workpiece 24 on its rear side. This impulse is fed to the time meter and indicated by the latter in time units.

Figure 3:
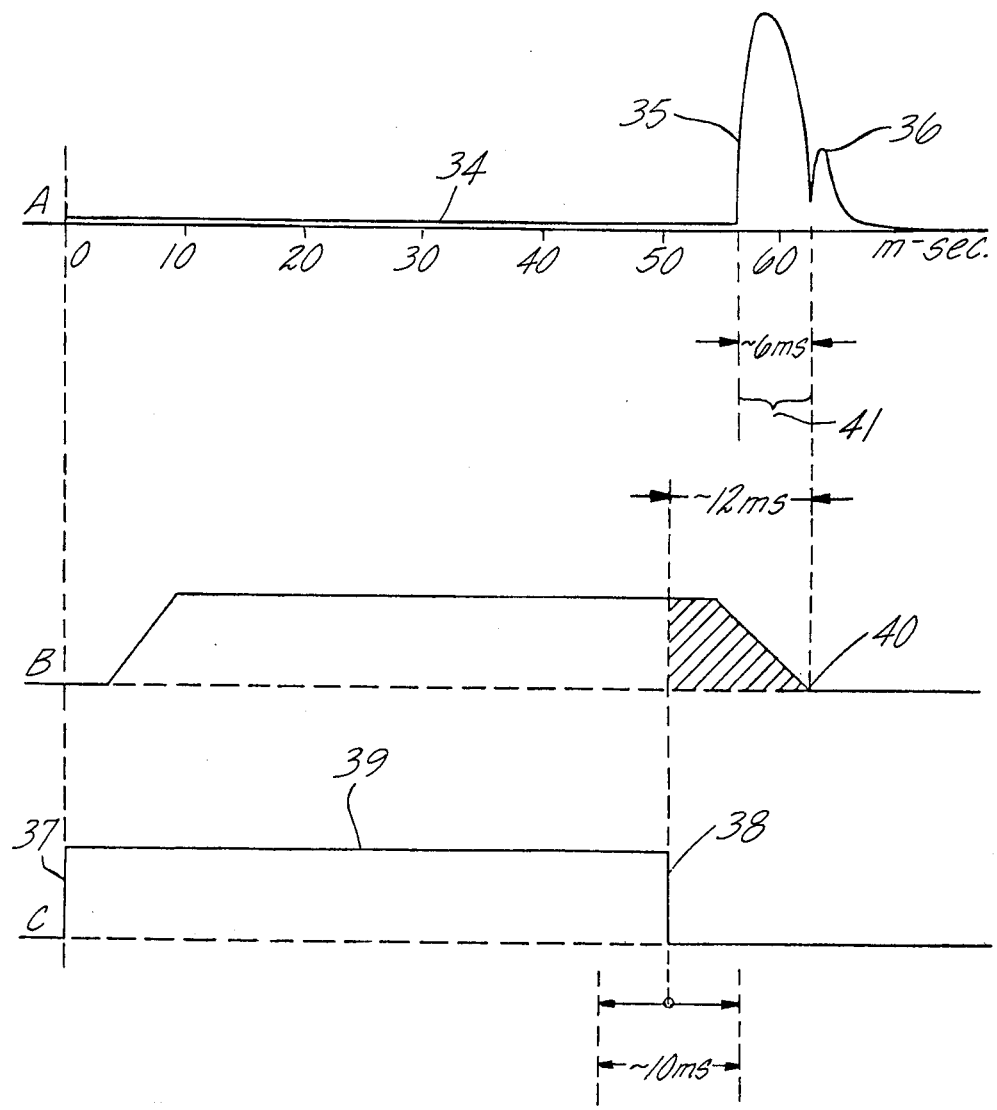
FIG. 3 illustrates a diagram (graph) to show the welding operation and the operation of the lifting solenoid.

The operations which occur in the circuit according to FIG. 2 are shown diagrammatically in the graph, FIG. 3. Axis A, divided into time units of milliseconds, shows the current flowing through the welding stud 5 and the workpiece 24 of FIG. 2. According to the explanations given at the beginning, the auxiliary current 34 first flows in a relatively weak arc after the welding stud is removed from the workpiece until by the closing of the contact 23, according to FIG. 2, the condensor 22 is discharged, which produces the welding current impulse 35. This welding current impulse flows for about 6 milliseconds. If the method of operation is correct, as shown, the rear flank of the impulse 35 coincides with the renewal of the contact of the welding stud 5 with the workpiece 24, whereby the welding stud 5 dips into the melted part of the workpiece 24. At this moment the arc voltage disappears so that the welding current, as a result of the removal of this voltage can rise for a short time up to the peak current 36, and then finally drop.

The movement of the stud holder 4 of FIG. 1 is shown on axis B. Finally, the current for the solenoid 6 of FIG. 1 is entered over axis C. The front flank 37 of the current impulse on axis C for the solenoid 6 in FIG. 1 corresponds to the closing of the contact 9 in the circuit according to FIG. 1. It will be remembered from the discussion of FIG. 1 that a first impulse is thereby generated. This first impulse 12 represents the current impulse entered over axis C. The point in time 40 on axis B is determined by the rear flank 38 of the current impulse 39, this point in time being when the welding stud again comes into contact with the workpiece 24, that is when it dips into the melted part of the workpiece. The beginning of the current impulse 39, given by its front flank 37, is defined by the closing of the contact 9 according to FIG. 1. The length of this current impulse can (as already shown above) be set as required on the control unit for the stud welding gun. That is, the rear flank 38 can be displaced laterally either forward or backward, as indicated on axis C above the period of about 10 milliseconds. With the displacement of the rear flank 38 there must of necessity be also a displacement of the point in time 40 on axis B, that is the time when the welding stud 5 dips into the melted part of the workpiece 24. In this connection it should however be mentioned that the rear flank of the impulse 35 (see axis A) is determined by the front flank of the current impulse 39 since, as already shown above, since the time taken up to the closing of contact 23 is determined by the closing of contact 9 according to FIG. 1 (front flank 37), and the length of the impulse 35 is determined by the loading of the condensor 22. A displacement in time of the rear flank 38 has therefore no influence on the position in time of the impulse 35. Consequently, by displacing the rear flank 38 and a corresponding displacement of the point in time 40 one can set the time when the welding stud 5 dips into the workpiece 24 so that the operation shown over axis A occurs.

Since with the control unit and specific loadings of the condensor 22 the interval between the front flank 37 and the rear flank of impulse 35 is known, one can, by reading off the interval indicated on the time meter, which is equal to the interval 41 entered on axis A, immediately determine by what amount of time the time 40 must be displaced, which can then, as already shown, be achieved by a corresponding setting on the control unit.

In this way one can continuously check a stud welding gun while it is in use to see whether it is working at optimum efficiency. It is thus possible to avoid faulty welds which cannot immediately be recognized during the actual welding operation.

I claim:

1. A test process for drawn arc stud welding guns comprising the steps of:
    generating an electric starting signal which activates at least one electric solenoid associated with a holding means for a clamped-in welding stud, said generating step resulting from a switching operation occurring at the beginning of a welding operation,
    deriving an electric cut-out signal from the short circuiting caused by the impact of the welding stud on its counter-electrodes, and
    measuring the period of time between the electric starting signal and the electric cut-out signal.

2. The test process of claim 1 further comprising the step of:
    providing an indication of the measured period of time between the electric starting signal and the electric cut-out signal.

3. The test process of claim 1 wherein a plate simulating a workpiece is used so as to allow for a simulated welding operation and wherein said step of deriving an electric cut-out signal comprises the short circuiting of an auxiliary voltage between the clamped-in welding stud and the plate simulating a workpiece.

4. Testing apparatus for a drawn arc stud welding gun, said testing apparatus comprising:
    means for activating at least one electric solenoid associated with a holding means for a clamped-in welding stud so as to generate an electric starting signal from a switching operation occurring at the beginning of a welding operation,
    means for deriving an electric cut-out signal from the short circuiting caused by the impact of the welding stud on its counter-electrodes, and
    means for measuring the period of time between the electric starting signal and the electric cut-out signal.

5. The test apparatus of claim 4 further comprising:
    means for providing an indication of the measured period of time between the electric starting signal and the electric cut-out signal.

6. The test apparatus of claim 4 wherein a plate simulating a workpiece is used so as to allow for a simulated welding operation and wherein said means for generating an electric signal comprises:
    means for short circuiting the voltage between the clamped-in welding stud and the plate simulating a workpiece.

7. Test apparatus for a drawn arc stud welding gun, said testing apparatus comprising:
    means for generating a welding arc current in response to a switching action;
    a magnetic switch means responsive to the magnetic field generated by the welding arc current, said magnetic switch means requiring the passing of a threshold value of welding current before being responsive to the magnetic field thereby generated;
    electronic switching means responsive to the closed state of said magnetic switch for producing a pulse having a pulse width equal to the time in which the welding current exceeds the threshold value of welding current; and
    means, connected across the terminals of said electronic switching means, for measuring the pulse width of the produced pulse.

* * * * *